(12) United States Patent
Roberts et al.

(10) Patent No.: US 6,556,759 B2
(45) Date of Patent: Apr. 29, 2003

(54) INTEGRATED OPTICAL DEVICE

(75) Inventors: Stephen William Roberts, Winchester (GB); Bradley Jonathan Luff, Highfield (GB); John Paul Drake, Lambourn (GB); Stephen Geoffrey Unwin, Islip (GB)

(73) Assignee: Bookham Technology plc, Oxfordshire (GB)

( * ) Notice: Subject to any disclaimer, the term of this patent is extended or adjusted under 35 U.S.C. 154(b) by 0 days.

(21) Appl. No.: 09/864,393

(22) Filed: May 25, 2001

(65) Prior Publication Data

US 2002/0131747 A1 Sep. 19, 2002

(30) Foreign Application Priority Data

Mar. 16, 2001 (GB) .............................................. 0106744

(51) Int. Cl.⁷ ................................................. G02B 6/10
(52) U.S. Cl. ......................... 385/132; 385/129; 385/43; 385/44; 385/45
(58) Field of Search ................................. 385/132, 129, 385/45, 44, 43

(56) References Cited

U.S. PATENT DOCUMENTS

| | | | | |
|---|---|---|---|---|
| 4,877,299 A | * | 10/1989 | Lorenzo et al. ................. | 385/3 |
| 5,078,516 A | * | 1/1992 | Kapon et al. ................. | 385/129 |
| 5,199,092 A | * | 3/1993 | Stegmueller ................. | 385/129 |
| 5,354,709 A | | 10/1994 | Lorenzo et al. ............. | 437/129 |
| 5,502,779 A | * | 3/1996 | Magel ........................... | 385/1 |
| 5,799,119 A | * | 8/1998 | Rolland et al. ............. | 385/132 |
| 5,838,869 A | * | 11/1998 | Rasch et al. ................. | 385/132 |
| 6,108,464 A | * | 8/2000 | Foresi et al. ................. | 385/131 |
| 6,236,784 B1 | * | 5/2001 | Ido ................................ | 385/39 |
| 6,363,096 B1 | * | 3/2002 | Dodabalapur et al. ........ | 372/69 |
| 6,375,364 B1 | * | 4/2002 | Wu ................................ | 385/88 |
| 6,377,716 B1 | * | 4/2002 | Veldhuis et al. ................ | 385/1 |

FOREIGN PATENT DOCUMENTS

| | | |
|---|---|---|
| GB | 2345980 A | 7/2000 |
| JP | 04015604 | 1/1992 |
| JP | 2000-321452 | 11/2000 |
| WO | WO 95/08787 | 3/1995 |
| WO | WO 98/35250 | 8/1998 |

OTHER PUBLICATIONS

Janz, CF et al.: "Improved fibre coupling to GaAs/AlGaAs rib waveguides using a regrowth–free mode drive–down technique" May 23, 1996, vol. 32, No. 11, pp. 1002–1003.
Vukovic A. et al.: "Spectral method applied to design of spotsize converters" Dec. 4, 2000, vol. 33, No. 25, pp. 2121–2123.
International Search Report mailed on Jun. 3, 2002.

* cited by examiner

Primary Examiner—Robert H. Kim
Assistant Examiner—Richard Kim
(74) Attorney, Agent, or Firm—Fleshner & Kim, LLP

(57) ABSTRACT

A rib waveguide structure comprising a layer (4) of light conductive material defined between two planar faces with a rib (9) formed on one of the faces and an optical component e.g. a tapered waveguide (6) optically coupled to the other face. An inverted rib waveguide comprising a light conductive layer (11) and a rib (10) that projects from the light conductive layer (11) into a substrate (4,8) is also described as well as other optical devices comprising a light conductive layer separated from a substrate by a non-planar layer (3) of light confining material and optical devices comprising two or more layers (2, 3; 18, 19, 20) of light confining material buried within a rib with a light conducting component (10; 17; 22) at least a part of which is formed between planes defined by the two layers of light confining material. A method of forming such devices is also described.

20 Claims, 3 Drawing Sheets

INTEGRATED OPTICAL DEVICE

FIELD OF THE INVENTION

This invention relates to an integrated optical device and more specifically to rib waveguides and to particular forms of buried layers used in waveguides or other devices.

BACKGROUND OF THE INVENTION

Rib waveguides (also known as ridge waveguides) are known and are used, in particular, in silicon-on-insulator (SOI) devices. Further details of these are given in WO95/08787 and the references mentioned therein. Essentially, a rib waveguide comprises a slab region with a rib projecting from a major face of the slab region. The optical mode is guided by the rib and part of the slab region from which the rib projects.

With the increasing use of rib waveguides and optical devices integrated on SOI chips, greater flexibility in the form and design of the waveguides and other integrated optical components is required to minimise optical losses and to allow the fabrication of more complex devices.

SUMMARY OF THE INVENTION

According to a first aspect of the invention, there is provided a rib waveguide structure comprising a layer of light conductive material defined between two substantially planar faces with a rib formed on one of the faces and an optical component optically coupled to the other face.

According to a second aspect of the invention, there is provided a rib waveguide formed within a substrate, the waveguide comprising a light conductive layer defined between two substantially planar faces with a rib formed on one of the faces, wherein the rib projects from the light conductive layer into the substrate.

According to a third aspect of the invention, there is provided an integrated optical device comprising a light conductive layer separated from a substrate by a layer of light confining material wherein said layer of light confining material is non-planar.

According to a fourth aspect of the invention, there is provided an integrated optical device comprising two or more layers of light confining material buried within a substrate with a light conducting component at least part of which is formed between planes defined by said two layers of light confining material.

According to a fifth aspect of the invention there is provided a method of forming an integrated optical device in which:

a substrate comprising first and second buried layers of light confining material is selected or formed, the first buried layer being closer to an outer surface of the substrate than the second buried layer;

etching trenches in the substrate extending from the first buried layer to the second buried layer;

filling the trenches with material having a refractive index lower than that of the substrate; and increasing the thickness of the substrate on the side of the first buried layer facing away from the second buried layer.

Preferred and optional features of each aspect of the invention will be apparent from the following description and from the subsidiary claims of the specification.

BRIEF DESCRIPTION OF THE DRAWINGS

The invention will now be further described, merely by way of example, with reference to the accompanying drawings, in which.

DETAILED DESCRIPTION OF REFERRED EMBODIMENTS

Figure 1A:
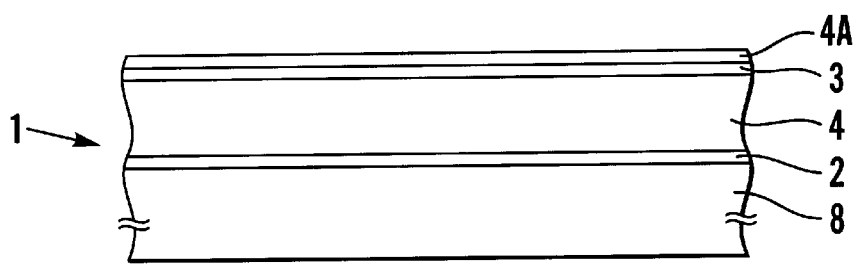
FIGS. 1A to 1E illustrate steps in the formation of an optical device comprising a tapered waveguide beneath a rib waveguide according to one embodiment of the first aspect of the invention.

FIGS. 1A–1E illustrate the fabrication of a tapered waveguide beneath a rib waveguide. The device is fabricated from a silicon chip 1 having two buried oxide layers 2,3. The lower oxide layer 2 is similar to the buried oxide layer of a conventional SOI chip and separates a silicon layer 4 from a substrate 8, which is also typically of silicon. The layer of silicon 4 above the oxide layer 2 is formed with a thickness of about 8 microns. A further oxide layer 3, is formed e.g. by implantation, at the top of the silicon layer 4 (in practice just below the surface of the silicon layer so a thin layer 4A of silicon is present above the oxide layer 3).

Figure 1B:
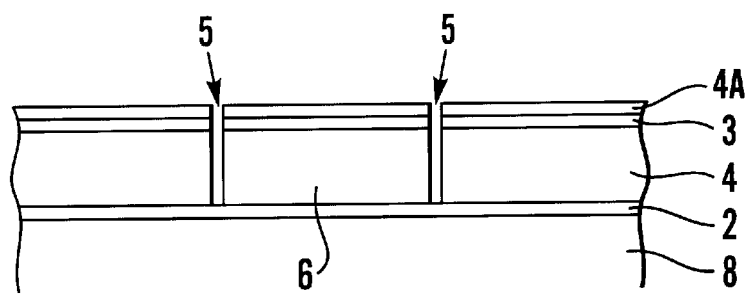

Deep etches 5 are then made through the chip to the lower oxide layer 2 in the shape of a taper, i.e. to define a triangular or wedge-shaped portion 6 in the silicon layer 4 as shown in FIG. 1B (which shows an end view of the wide end of the triangular portion 5).

Figure 1C:
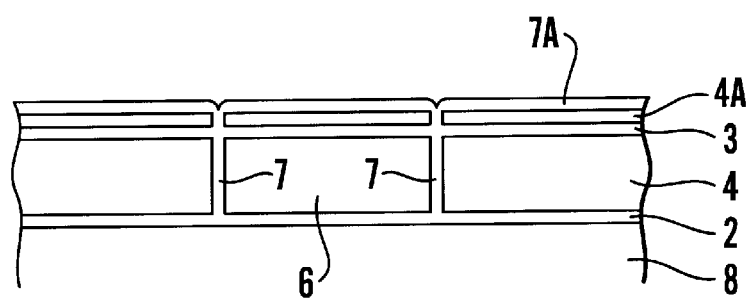

The trenches are then filled with silicon dioxide 7, for example by thermal oxidation of the surface of the silicon, or other material of lower refractive index than the portion 6 as shown in FIG. 1C, so that the trenches are filled and the surface of the silicon dioxide 6 therein is substantially co-planar with the surface of the chip. An oxide layer 7A also forms over the silicon layer 4A during this process.

Figure 1D:
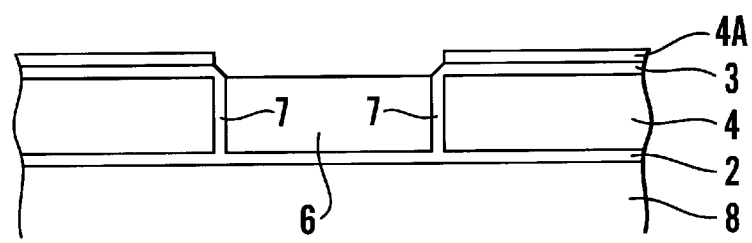
Figure 1E:
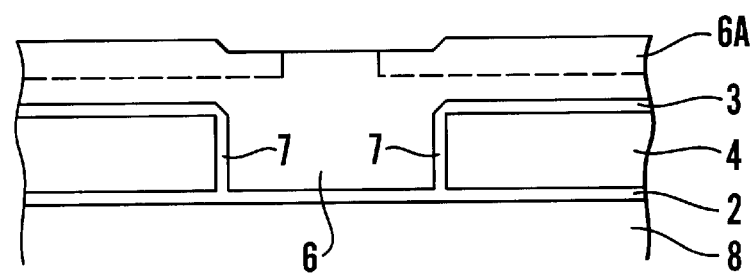

This layer 7A of oxide and the portion of silicon layer 4A above the triangular portion 6 are then removed as shown in FIG. 1D. The thickness of the exposed portion 6 is then increased by epitaxial growth as shown in FIG. 1E to form a silicon layer 6A. The top of the silicon layer 6A can then be polished, if necessary, to give it a flat surface ready for subsequent etching steps.

A rib waveguide 9 is then formed in the upper layer of silicon 6A above the upper oxide layer 3 in the conventional manner as indicated by dashed lines in FIG. 1E.

Figure 2:
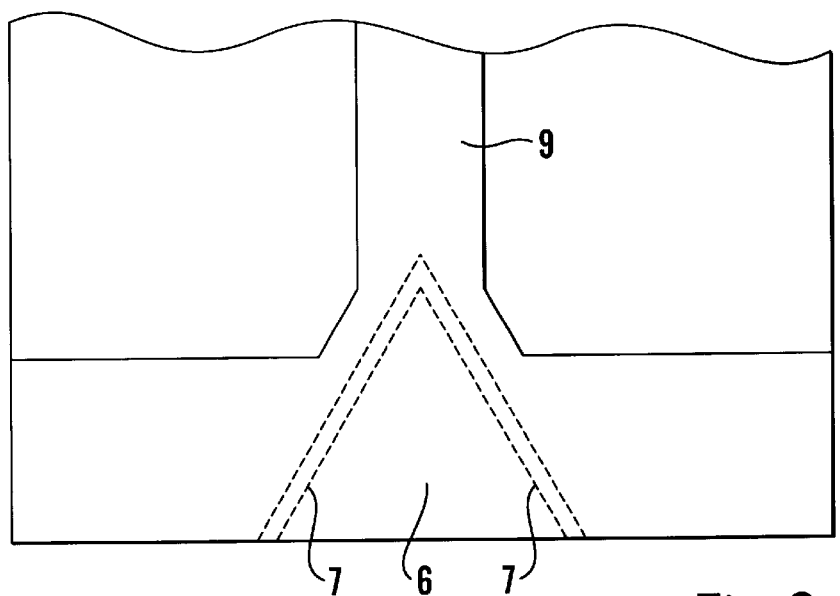
FIG. 2 is a plan view of the optical device thus formed.

FIG. 2 shows a plan view of a rib waveguide 9 which has been formed in the silicon layer 6A and shows the trenches filled with silicon dioxide 7, which define the wedge-shaped portion 6, in dashed lines as they are formed in the silicon layer 4 which lies beneath the layer 6A.

Figure 3:
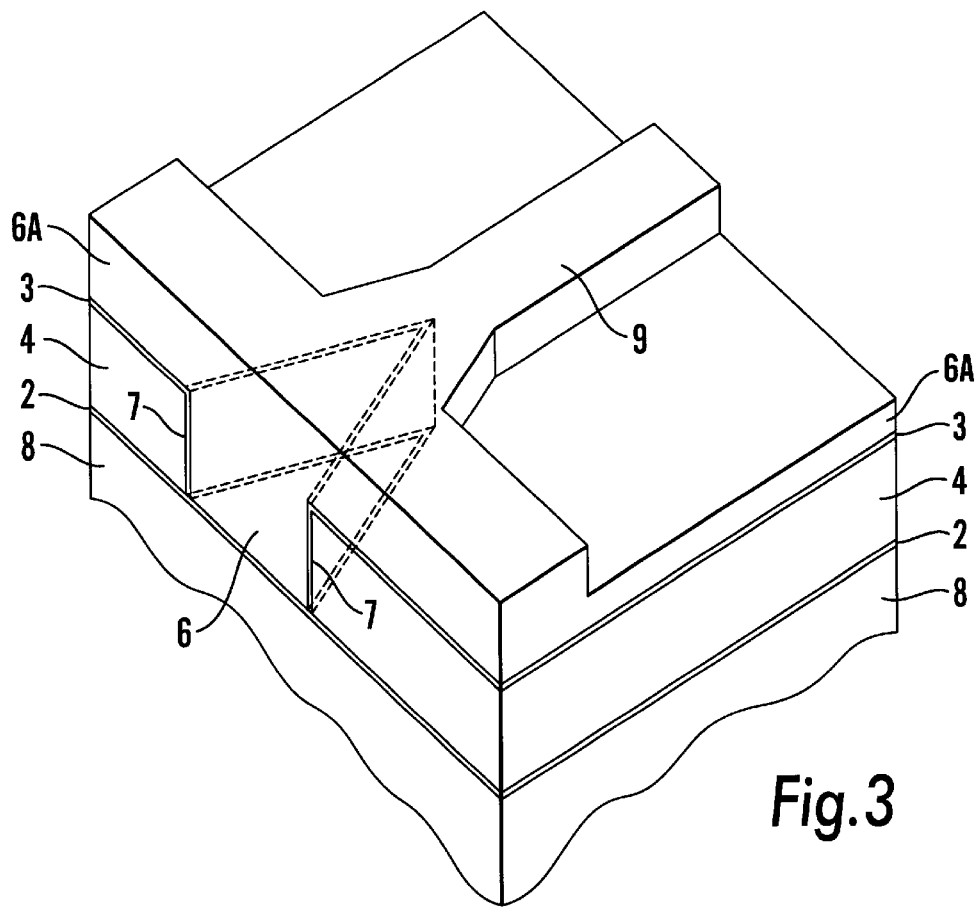
FIG. 3 is a perspective view of the optical device of FIG. 2.

FIG. 3 shows a perspective view of the rib waveguide 9 shown in FIG. 2 with the wedge-shaped portion 6 formed beneath the layer 6A in which the rib waveguide 9 is formed, shown in dashed lines.

By this means, the wedge-shaped portion 6 is formed beneath the, rib waveguide and. is optically coupled with a face of the silicon layer 6A opposite that on which the rib 9 is formed. This is in contrast with a known tapered waveguide in which a wedge-shaped portion is formed on the rib, e.g. as described in WO98/35250, the disclosure of which is incorporated herein. The arrangement shown in FIGS. 1–3 has significant advantages over this prior art. The wedge-shaped portion, as described in WO98/35250, is relatively fragile and subject to damage, e.g. when the wide end thereof is polished or when the chip is handled. In contrast, the buried wedge-portion 6 is much easier to polish as its edges are protected by the oxide 7 within the trenches 5. The taper can also be formed to a finer point as it too is protected by the oxide 7 in trenches 5 and is not exposed to damage. This enables the optical losses in coupling an optical signal from the wedge-shaped portion 6 to the rib waveguide 9, or vice versa, to be reduced.

Furthermore, fabrication of the upper silicon layer 6A and the rib waveguide 9 therein is not affected by the presence of the wedge-shaped portion 6. It can thus be fabricated with the accuracy of conventional rib waveguides since the upper surface of the silicon layer 6A is still substantially planar (the rib only projecting from the surface by about 1–3 microns) so it does not interfere significantly with spinning of a resist over the layer, the definition of a lithographic mask formed over the surface or the focussing of apparatus such as a stepper machine used in the fabrication thereof. This, again, is in contrast to the known arrangement described in WO98/35250, where the overall height of the device makes it difficult to fabricate accurately if deep etches are used to define the components in a single layer of silicon.

The buried wedge-portion described above thus provides the same function as the arrangement described in WO98/35250, i.e. a low loss coupling between a large waveguide and/or optical fibre and a smaller waveguide, yet is considerably easier to manufacture to the accuracy required.

Such a structure can be fabricated in other ways. A thin oxide layer (not shown) may also be provided between the wedge-shaped portion 6 and the rib waveguide 9 whereby these two parts can be fabricated at different stages in the fabrication process, the oxide layer being sufficiently thin so that it does not prevent optical interaction between the wedge-shaped portion 6 and the rib waveguide 9.

As the width of the wedge-shaped portion 6 reduces, the optical mode carried thereby is forced up into the rib waveguide 9 formed in the upper layer of silicon 6A. It will be appreciated that other optical components may be fabricated in a similar manner in the lower layer of silicon 4 and coupled to the rib waveguide 9 in the upper silicon layer 6A or to another optical component formed in the upper silicon layer 6A.

This method of manufacturing optical components in two layers with optical coupling between the devices in the two layers thus provides the possibility of forming two-layer integrated optical devices and circuits.

Figure 4:
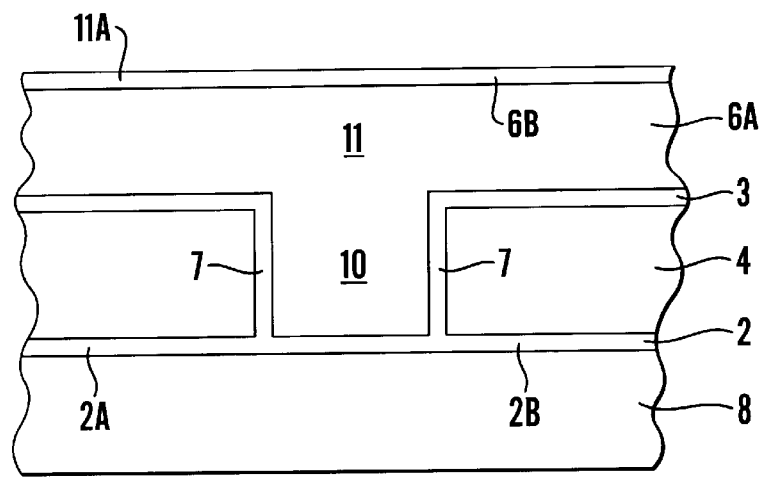
FIG. 4 is a cross-sectional view of an inverted rib waveguide according to an embodiment of the second aspect of the invention.

The method described above may also be extended to form an inverted rib waveguide as shown in FIG. 4. In this case, the two deep etches 5 illustrated in FIG. 1B would form two parallel trenches defining the side faces of an inverted rib 10 (rather than the wedge-shaped portion 6) and the upper layer of silicon 6A would form a slab region 11 with an oxide layer 11A formed thereon. Thus, the rib waveguide is formed in an inverted orientation compared to conventional rib waveguides. The slab region 11 is defined between an upper face 6B of the upper silicon layer 6A and the oxide layer 3 and the rib 10 projects from this slab region 11 into the substrate which, in this case, is provided by the lower layer 4 of the silicon but separated therefrom by the oxide 7 in the trenches 5 extending perpendicular to the surface of the chip and to the lower oxide layer 2.

Such an inverted rib waveguide has the advantage that the upper surface of the chip is substantially planar, although further devices may be formed in the upper silicon layer, or in a further silicon layer formed thereon, e.g. a further rib waveguide in the conventional orientation.

Alternatively, a conventional silicon rib waveguide may be formed, with an oxide layer formed on the surface thereof and further material deposited over the oxide layer (or the oxide layer increased in thickness substantially) to bury the rib waveguide. In these cases the portions 2A–2B of the lower oxide layer shown in FIG. 4 may not be present.

The methods described above can be further extended to enable other devices which require a non-planar oxide layer to be formed within a substrate to be fabricated. Thus, lower parts of the non-planar oxide layer are formed by the lower oxide layer 2, upper parts of the non-planar oxide layer are formed by the upper oxide layer 3 and the upper and lower parts of the non-planar oxide layer connected by trenches filled with oxide (or other suitable material).

Similarly, the methods described above can be extended to enable optical devices or components comprising two layers of buried oxide, with at least part of the component formed between the two layers, to be fabricated.

FIGS. 5A to 5E are schematic cross-sectional views of a selection of components which are envisaged. The thin layers shown being oxide layers or other suitable material serving to confine light within the components thus defined.

Figure 5A:
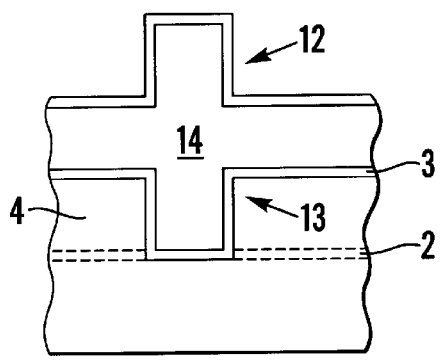
FIGS. 5A to 5C are cross-sectional views of the other optical devices according to embodiments of the third and fourth aspects of the invention.

FIG. 5A shows a conventional rib waveguide 12 projecting from the surface of a chip and a further inverted waveguide 13 buried in the chip. These may share a common slab region 14 or separate slab regions may be provided separated by a further oxide layer (not shown).

Figure 5B:
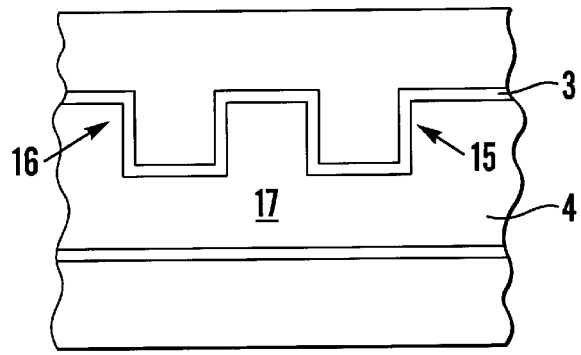

FIG. 5B shows a pair of inverted rib waveguides 15, 16. If these are spaced apart by an appropriate distance they define a further, upright but buried rib waveguide 17 therebetween.

Figure 5C:
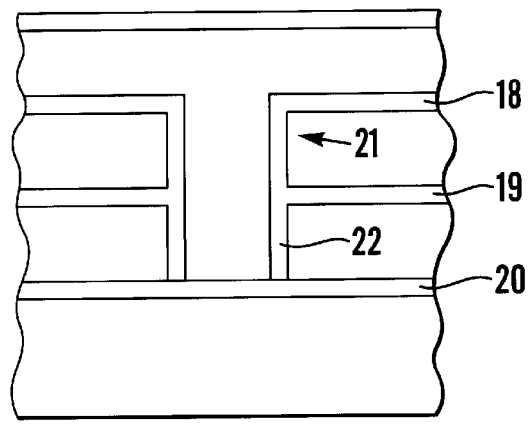

FIG. 5C shows a device comprising three buried oxide layers 18, 19 and 20. This enables an inverted rib waveguide 21 to be formed as in FIG. 4 but with a further component, e.g. a buried wedge-shaped portion 22 (similar to that of FIG. 1E), formed beneath the inverted rib waveguide. The device thus comprises a complete inversion of the tapered waveguide described in WO98/35250.

It will be appreciated that when the device is formed of silicon, a native oxide layer tends to form on any exposed surface thereof. The thickness of this oxide layer can be increased by thermal oxidation.

What is claimed is:

1. An integrated optical device, comprising:
   a substrate;
   a first light confining layer on said substrate;
   a light conductive material layer separated from the substrate by the first light confining layer;
   a trench formed through the light conductive material layer to the first light confining layer defining a triangular, wedge-shape portion of light conductive material within the trench;
   a light confining material within said trench; and
   a rib waveguide provided over the triangular, wedge-shape portion such that a lower portion of the rib waveguide is optically coupled with said triangular, wedge-shape potion of the light conductive material layer.

2. The integrated optical device as claimed in claim 1, wherein the rib waveguide comprises a rib projecting from one side of a slab region, and wherein the triangular, wedge-shape portion is optically coupled to the opposite side of the slab region.

3. The integrated optical device as claimed in claim 1, wherein the triangular, wedge-shape portion is buried within the device.

4. The integrated optical device as claimed in claim 1, further comprising an optical coupling between said rib waveguide and a second waveguide or optical fiber coupled to a wide face of said triangular, wedge-shaped portion.

5. The integrated optical device as claimed in claim 4, wherein the wide face is substantially perpendicular to a length of the rib waveguide, and wherein the optical coupling is between the rib waveguide and the second waveguide, wherein the second waveguide has an optically coupled face with a larger surface area than a surface area of an optically coupled face of the rib waveguide.

6. The integrated optical device as claimed in claim 1, further comprising a second light confining layer formed within said light conductive material layer.

7. The integrated optical device as claimed in claim 1, wherein the light conductive material layer comprises silicon.

8. The integrated optical device as claimed in claim 1, wherein the light confining material comprises an oxide, and wherein said triangular, wedge-shape portion has five faces: three vertical faces, two of which are adjacent to the trench, and two horizontal faces, wherein a top horizontal face is adjacent to the rib waveguide and a bottom horizontal face is adjacent to the substrate.

9. The integrated optical device as claimed in claim 1, further comprising a thin oxide layer between the triangular, wedge-shape portion and the rib waveguide.

10. The integrated optical device as claimed in claim 1, wherein the rib waveguide is above the triangular, wedge-shaped portion, wherein the triangular, wedge-shape portion is optically connected to a slab region of the rib waveguide, and wherein the rib waveguide has a narrow section which widens to the slab region defined by an upper face of the light conductive material layer, and wherein the rib waveguide comprises silicon and the light confining material in the trench comprises silicon dioxide.

11. The integrated optical device as claimed in claim 1, wherein the triangular, wedge-shape portion comprises a buried wedge, and wherein the buried wedge is protected by oxide in the trench, and wherein the trench and the light conductive material layer are substantially the same height.

12. A method of forming an integrated optical device, comprising:

forming a light conductive material layer separated from a substrate by a first light confining layer;

etching a trench through the light conductive material layer to the first light confining layer to define a triangular, wedge-shape portion in the light conductive material layer;

filling said trench with a light confining material;

increasing the thickness of the light conductive material layer over said triangular, wedge-shape portion; and forming a rib waveguide in the light conductive material layer optically coupled with said triangular, wedge-shape portion of the light conductive material layer.

13. The method as claimed in claim 12, wherein the light conductive material layer comprises silicon.

14. The method as claimed in claim 12, wherein the light confining material comprises an oxide, and wherein said triangular, wedge-shape portion has five faces: three vertical faces, two of which are adjacent to the trench, and two horizontal faces, wherein a top horizontal faces is adjacent to the rib waveguide and a bottom horizontal face adjacent to the substrate.

15. The method as claimed in claim 12, wherein said filling of said trench comprises thermally oxidizing the light conductive material layer, and wherein said filling of said trench fills from a top surface of the first light confining layer to a top surface of the trench in the light conductive material layer.

16. The method as claimed in claim 12, further comprising planarizing said filling of said trench to be substantially co-planar with an upper surface of the light conductive material layer before increasing the thickness of the light conductive material layer and forming the rib waveguide.

17. The method as claimed in claim 12, wherein said forming of the rib waveguide occurs on an upper surface of the triangular, wedge-shape portion and the light conductive material layer, and further comprising forming a thin oxide layer between the triangular, wedge-shape portion and the rib waveguide.

18. An integrated optical device, comprising:

a substrate;

a first light confining layer on said substrate;

a light conductive material layer separated from the substrate by the first light confining layer;

a trench formed through the light conductive material layer to the first light confining layer defining a triangular, wedge-shape portion of light conductive material within the trench;

a light confining material within said trench between the triangular, wedge-shape portion and a remaining section of the light conductive material layer; and a rib waveguide provided over the triangular, wedge-shape portion such that a lower portion of the rib waveguide is optically coupled with said triangular, wedge-shape potion of the light conductive material layer, wherein the trench and the light conductive material layer are substantially the same height.

19. The integrated optical device as claimed in claim 18, wherein said light confining material in the trench extends from a top surface of the first light confining layer to a top surface of the trench in the light conductive material layer, and wherein a top surface of said light confining material is substantially co-planar to the top surface of the light conductive material layer.

20. The integrated optical device as claimed in claim 18, wherein said triangular, wedge-shape portion is in direct contact with both the rib waveguide and the first light confining layer.

* * * * *